Patented Feb. 25, 1930

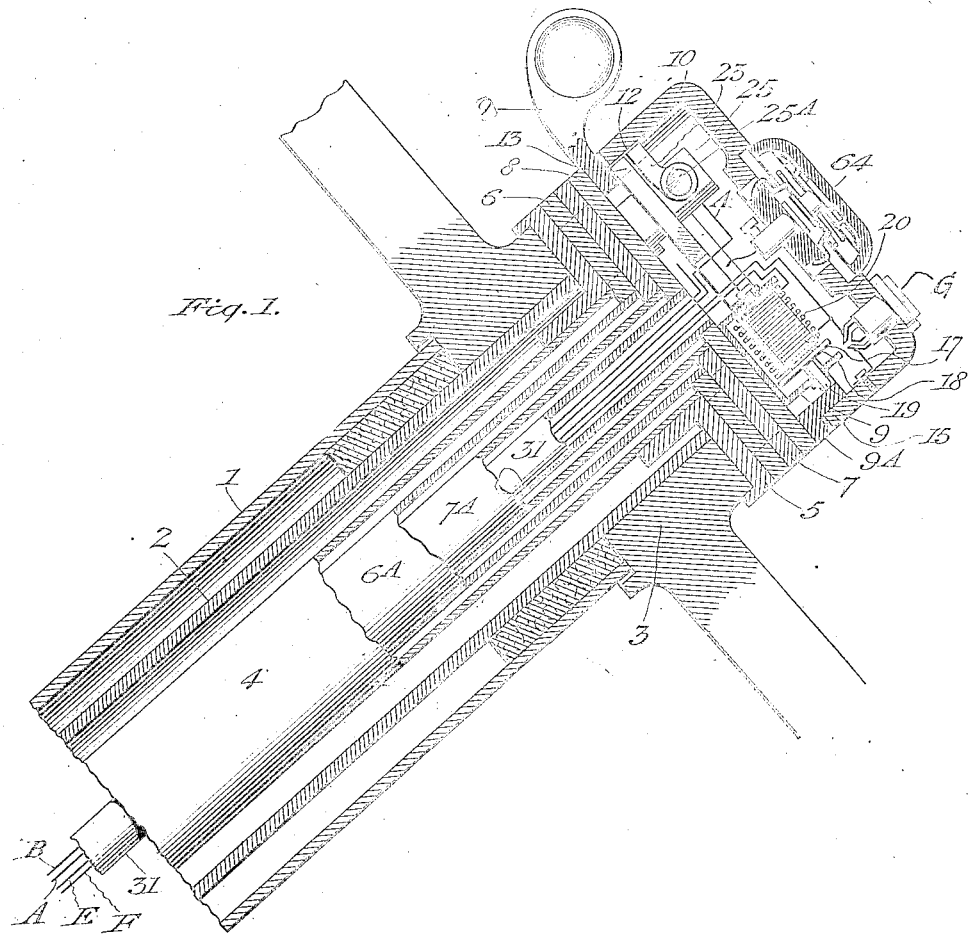

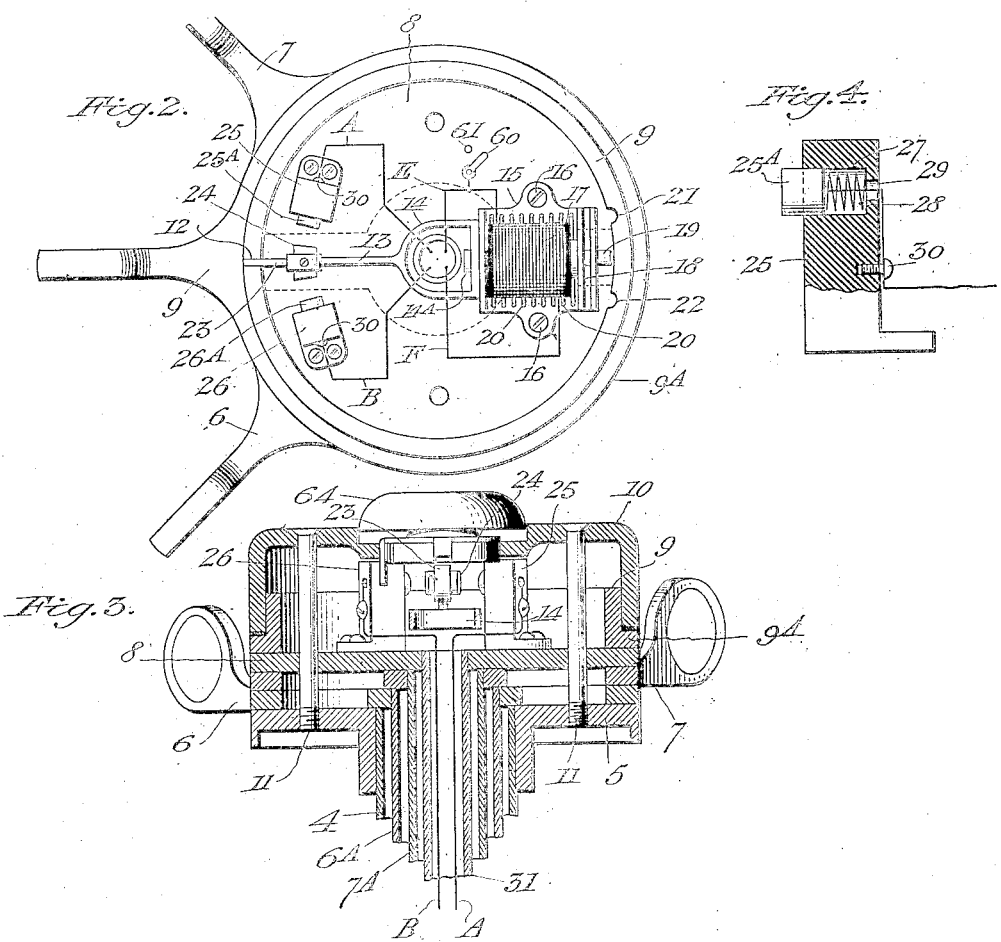

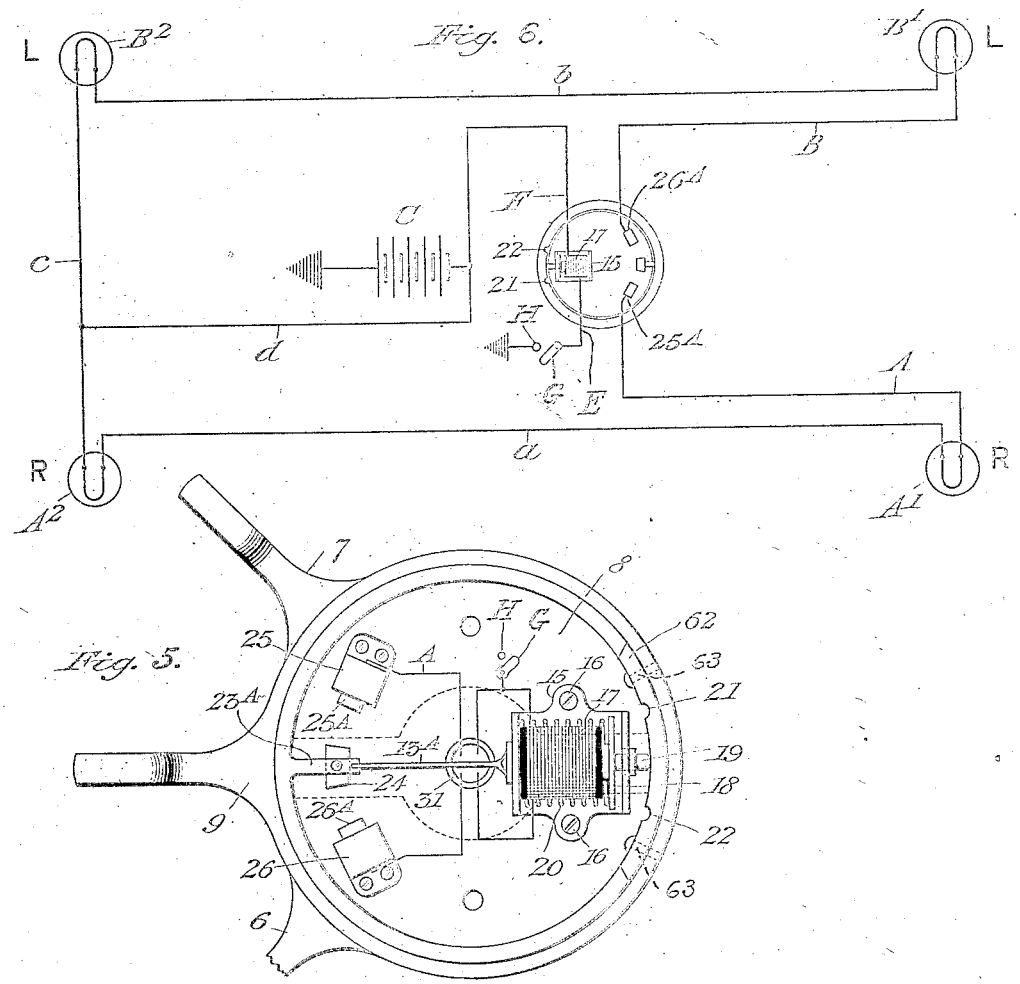

1,748,929

UNITED STATES PATENT OFFICE

HUBERT E. WOODRING, OF DENVER, COLORADO

SIGNALING MECHANISM FOR AUTOMOBILES

Application filed June 6, 1927. Serial No. 196,316.

My invention relates to improvements in automobile signal light operating mechanism.

The primary object of the invention is to provide signal light operating mechanism comprising manually operated means for switching on the signal lights to indicate either a right or left turn.

A further object of the invention is to provide mechanism of this character comprising a manually operated lever and parts cooperating therewith for turning on the signal lights in making either a right or left turn, said lever and parts being preferably secured upon the upper end of the stationary tube of the steering assembly.

These objects are accomplished by the mechanism illustrated in the accompanying drawings in which:

Figure 1 is a sectional view through the upper end of the steering column and associated parts, showing the manner of supporting the manually operated parts of the mechanism.

Figure 2 is a plan view of the mechanism shown in Figure 1, the cap inclosing the mechanism being removed.

Figure 3 is a sectional view through the upper part of Fig. 1, and on a line at right angles thereto.

Figure 4 is a sectional view (enlarged) of one of the contact supports shown in Fig. 2.

Figure 5 is a plan view similar to Fig. 2, but showing a slight modification in the construction of the ring lever for closing the lamp circuits.

Figure 6 is a diagram of the signal light circuit and the mechanism for opening and closing the same with respect to the current source.

Referring to the accompanying drawings:

The numeral 1 indicates the steering column of an automobile, and 2, the steering shaft to which the hub 3 of the steering wheel is rigidly secured in the usual manner, and within the steering shaft is the usual stationary tube 4. A cap 5 is secured upon the upper end of the tube 4, which supports the ring portion of the spark lever 6, upon which rests the ring portion of the gas lever 7; the spark lever being connected to the operating tube 6A and the gas lever being connected to the operating tube 7A, as in the usual manner. Upon the ring portion of the lever 7 rests a disk 8, upon which rests a ring 9 which constitutes the circuit closer for the signal lights, as will be hereinafter set forth. The ring 9 comprises an annular wall having an outwardly projecting flange 9A on its lower end upon which rests the rim of a cap 10 which encloses the signal-light-circuit closing means and other mechanism to be presently described. The cap 10 is secured to the cap 5, as clearly shown in Fig. 3, by screws 11, which pass down through holes in the disk 8, and through the ring portions of the levers 6 and 7 into threaded holes in the said cap 5.

The ring portions of the levers 6 and 7 are each formed with a single diametric bar having a hub for the reception of the tubes 6A and 7A respectively, and this construction provides open spaces in the rings through which the screws 11 pass, as shown by the dotted lines in Figures 2 and 7. The screws 11, hold the disk 8 and the cap 10 stationary, and the disk 8 forms a base or support for mechanism which will now be described. The wall of the ring 9 is formed with a vertical slot or recess 12 in which is secured one end of a spring arm 13, the opposite end of which terminates in a ring-like member 14 having a straight side which is secured by a screw 14A to one end of a yoke shaped support or saddle 15, the base or horizontal portion of which is secured to the disk 8 by screws 16. A magnet 17 of the spool type is secured to the saddle 15 by the screw 14A, and this magnet extends to within a short distance of the opposite end of the saddle. One terminal of the magnet is connected by a wire F with the negative pole of the battery, and the other terminal is connected by a wire E with a switch G which connects the wire E with a ground contact H.

A metal disk 18 is interposed between the free end of the magnet and the adjacent end of the saddle, and this disk is formed with a short plunger 19 which passes through a hole in the end of the saddle and is held in engagement with the wall of the ring 9 by a coil spring 20, which surrounds the magnet and is under tension between the disk 18 and the opposite end of the saddle, as shown by Fig. 2.

The wall of the ring 9 is formed with notches 21 and 22 which are located respectively on opposite sides of the plunger 19, and a short distance from the same. When the ring 9 is turned toward the right until the notch 21 registers with the plunger, the said plunger is forced into the notch 21 by the spring 20 and locked in that position; and when the ring is turned in the opposite direction the plunger enters the notch 22 and locks the ring in that position.

Within the notch 12 of the ring 9 and above the end of the spring arm 13 is secured one end of a short spring arm 23, the opposite end of which terminates in a hub in which is removably secured a contact element 24, preferably a piece of carbon, which projects slightly beyond each side of the said hub. Upon the disk 8 and on opposite sides of the arm 23, are secured vertical supports 25 and 26, respectively, which may be of any suitable non-conducting material.

The upper portion of each of these supports is formed with a circular horizontal recess 27, and in these recesses are slidably mounted carbon contacts 25A and 26A respectively, and coil springs 28 are interposed between the inner ends of the contacts and the end walls of the recesses 27, and these end walls are provided with small openings 29 through which pass the current wires A and B respectively, the ends of which are secured to the respective contacts.

The wires are secured to the supports by binding screws 30, and thus hold the contacts in the recesses 27, against the tension of the springs 28. When the ring 9 is turned in either direction, the corresponding end of the contact 24 engages the contact 25A or 26A, as the case may be, and the springs 28 permit a yielding movement of these contacts to allow a slight over push of the lever after engagement of the contacts and before the plunger 19 springs into the notch 21 or 22, whereby the contact 25A or 26A is held in positive engagement with the corresponding end of the contact 24.

The current wire A which connects with the terminal contact 25A passes from the support 25 through a tube 31 which extends down through the tube 7A which connects with the gas or throttle lever 7, the tube 31 being secured at its upper end in a hole in the disk 8. From the tube 31 the wire A passes to and connects with one of the terminals of the front right hand signal lamp A¹, of the automobile, the other terminal of which is connected by a wire —a— with one of the terminals of the rear right hand lamp A², the other terminal of which is connected by a wire —c— with one of the terminals of the rear left hand lamp B², the other terminal of which is connected by a wire —d— with one terminal of the front left hand lamp B¹, the other terminal of which is connected by the wire B with the contact 26A, the wire B also passing through the tube 31.

The wire —c— is connected by a wire —d— with one terminal of a battery C, or other current source, the other terminal of which is grounded to the frame of the car. It will thus be seen that the current passes from the battery through wires —d— and —c— to either the right or left hand front and rear lamps; thence to the contact 25A and 26A as the case may be to the contact 24, and thence through the frame to the grounded terminal of the battery, thus completing a circuit through either set of lamps and the battery.

When the lever 9 is turned in either direction, the movement is against the tension of the spring arm 13, and therefore when the lever 9 is released by the withdrawal of the plunger 19 from either notch 21 or 22, the lever 9 is thrown by the spring arm 13 to a neutral position, or in such a position that the plunger stands midway between the notches 21 and 22, as shown in Figures 2 and 5, and the lights are thereby shut off.

In practice, when it is desired to make a turn in either direction, for example, a right hand turn, the lever 9 is turned to the right to bring the contact 24 into engagement with the contact 25A, the plunger 19 is forced into the notch 21, and the lever is thus locked. The current then passes from the negative pole of the battery through wires —d— and —c— to the lamp A², thence through wire —a— to lamp A¹ and thence through wire A to contact 25A and thence through contact 24 and arm 23 to the ring 9 and thence through the frame to the positive pole of the battery, thus closing the circuit through the battery and turning on the lights. By moving the switch G into engagement with the ground contact H, a circuit is closed through the magnet whereby the plunger is retracted to release the ring A.

In Fig. 5 is shown a slight modification in the arrangement of the ring or lever 9. In this view, the arm 23 and the slot or recess 12 in which it is secured, are dispensed with, and the ring is formed with an integral arm 23A in which the double ended contact 24 is secured. A spring arm 13A takes the place of the spring arm 13, and one end of this arm is secured to the saddle 15 and its opposite end is secured in a notch or recess in the arm 23A. In other respects, the arrangement is the same as that shown in Figure 2.

In Fig. 5, the ring 9 is provided with a removable segment 62, having the notches 21 and 22 formed therein. This segment is made of steel to withstand the wearing action of the plunger 19. The segment is secured to the ring by screws 63. This arrangement permits the ring to be made of a softer and lighter metal, such as aluminum.

The cap 10, may be made of a suitable composition, such as bakelite, and in this case, one of the terminals of the push button 60 would be grounded to a metal element such as the disk 8, instead of to the cap, as shown in Fig. 1. The usual horn button 64 is secured in the cap 10 as shown, and the wire from this button will extend down through the tube 31.

It will be obvious, that many changes might be made in the construction and arrangement of the mechanism, without departing from the spirit of the invention.

Having described my invention, what I claim as new and desire to secure by Letters Patent, is:—

1. In signaling mechanism of the character described, a disk, oppositely disposed contacts on said disk, a cap in fixed relation to said disk, a rotatable element fitted in said cap and means thereon for engaging either contact, a magnet, a spring operated latch in relation to said magnet for locking said rotatable element in engagement with either contact, said magnet acting when energized to retract the spring operated latch and release the rotatable element, and a spring to restore the rotatable element to a neutral position.

2. In signaling mechanism for automobiles, a disk, oppositely disposed contacts, on said disk, a non-pivoted rotatable element and a conductor thereon for engaging either contact, a magnet, a spring operated latch in relation to said magnet, for engaging and locking said rotatable element to hold said conductor in engagement with either contact, said magnet acting when energized to retract the spring operated latch, and release the rotatable element, and a spring to restore the rotatable element to a neutral position between said contacts.

3. In signaling mechanism of the character described, a disk, oppositely disposed yielding contacts, on said disk, a circular rotatable element on said disk, and a conductor thereon for engaging either contact a circular guide surrounding said rotatable element and in fixed relation to said disk, a magnet on said disk, a spring operated latch in relation to said magnet for engaging and locking said rotatable element to hold said conductor in engagement with either contact, said magnet acting when energized to retract said spring operated latch and release the rotatable element, and a spring for restoring the rotatable element to a neutral position.

4. In signaling mechanism of the character described, a disk, oppositely disposed yielding contacts on said disk, a cap in fixed relation to said disk, a notched rotatable spring controlled ring on said disk fitted in said cap having a double ended circuit closer normally disposed between said contacts, and adapted to engage either one of them, a magnet on said disk, a spring operated latch in relation to said magnet for engaging a notch in said rotatable member to hold said conductor in engagement with either contact, said magnet acting when energized to retract said spring operated latch thereby to release the rotatable member and permit the same to turn to a neutral position.

5. In signaling mechanism of the character described, a disk, oppositely disposed yielding contacts on said disk, a flanged ring rotatably mounted on said disk having notches in its inner edge and a conductor normally positioned midway between said contacts, and adapted to engage either of them by the turning of the ring, a supporting cap surrounding the ring and resting on the cap thereof and in fixed relation to the disk, a magnet on said disk, a spring operated latch in relation to said magnet, which is adapted to engage one of said notches when the ring is turned, to hold said conductor in engagement with one of the contacts, said latch being retracted when the magnet is energized thereby to release the ring, and a spring for turning the ring to a neutral position.

6. In signaling mechanism of the character described, a disk, oppositely disposed non-conducting supports on said disk, yielding terminal contacts mounted in said supports, a cap in fixed relation to the disk, a ring rotatably mounted in said cap and resting on said disk having a pair of spaced notches in its inner edge and a conductor normally positioned midway between said contacts, a magnet on said disk, a spring operated plunger in relation to said magnet which normally bears against the ring midway between said notches, and is adapted to spring into one of said notches when the ring is turned, thereby to hold the said conductor in engagement with one of said contacts, said latch being retracted when the magnet is energized, thereby to release the ring, and a spring for turning the ring to a neutral position.

7. In signaling mechanism of the character described, a disk, a bracket secured upon said disk, a magnet secured to said bracket, yielding oppositely disposed terminal contacts on said disk, a ring rotatably mounted on said disk having an inwardly projecting spring arm, the free end of which is secured to said bracket, said spring arm being normally positioned midway between said terminal contacts, a conductor carried by said spring arm for engaging either contact, said ring having a pair of spaced notches in its inner edge, a cap in fixed relation to said disk in which said ring is rotatably supported, a spring operated plunger mounted in said bracket in relation to said magnet, and adapted to engage one or the other of said notches when ...ring is turned thereby to hold the said
...ductor in engagement with one of said
...tacts, said latch being retracted when the
...agnet is energized, thereby to release the
...ing, which is then turned to a neutral position by its spring arm.

8. In signaling mechanism of the character described, a disk, oppositely disposed contacts on said disk having an inwardly extending arm, a flanged ring rotatably mounted on said disk and a conductor therein for engaging either contact, a magnet on said disk, a spring operated latch in relation thereto for locking said ring to hold said conductor in engagement with one of said contacts, said magnet acting when energized to retract said latch, thereby releasing said ring, a spring connected at one end to said arm and in fixed relation to the disk at its other end to restore said ring to a neutral position, and means for holding said ring in rotatable relation on said disk, comprising a cap extending over said ring and resting on the flange thereof and screws which pass through said cap and said disk.

9. In signaling mechanism of the character described, a disk; oppositely disposed contacts on said disk; a ring rotatably mounted on the disk having a pair of notches on its inner face and a conductor for engaging either contact; a bracket on the disk; a magnet secured thereto; a spring-operated latch slidably mounted in the bracket in relation to said magnet, for engaging either notch to lock said ring in engagement with either contact, said magnet acting when energized to retract the latch and release the ring, and a spring secured at one end to said ring and at its other end to said bracket, said spring acting to turn the ring so that the said conductor will stand in a neutral position between the two contacts.

In testimony whereof, I affix my signature.

HUBERT E. WOODRING.